(12) United States Patent
Juravicius et al.

(10) Patent No.: US 11,379,542 B1
(45) Date of Patent: Jul. 5, 2022

(54) ADVANCED RESPONSE PROCESSING IN WEB DATA COLLECTION

(71) Applicant: Metacluster LT, UAB, Vilnius (LT)

(72) Inventors: Martynas Juravicius, Vilnius (LT); Andrius Kuksta, Vilnius (LT)

(73) Assignee: Metacluster LT, UAB, Vilnius (LT)

( * ) Notice: Subject to any disclaimer, the term of this patent is extended or adjusted under 35 U.S.C. 154(b) by 0 days.

(21) Appl. No.: 17/359,082

(22) Filed: Jun. 25, 2021

(51) Int. Cl.
  *G06N 20/00* (2019.01)
  *G06F 16/953* (2019.01)
  *G06K 9/62* (2022.01)
  *G06V 10/46* (2022.01)

(52) U.S. Cl.
  CPC ......... *G06F 16/953* (2019.01); *G06K 9/6263* (2013.01); *G06K 9/6278* (2013.01); *G06N 20/00* (2019.01); *G06V 10/464* (2022.01)

(58) Field of Classification Search
  CPC ...... G06F 40/30; G06F 16/367; G06F 16/355; G06F 16/36; G06F 16/951; G06F 16/00; G06F 16/80; G06F 16/835; G06F 16/9017; G06F 16/9024; G06F 16/9027; G06F 16/95; G06N 20/00; G06V 30/416; G06K 9/6282
  See application file for complete search history.

(56) References Cited

U.S. PATENT DOCUMENTS

2005/0050461 A1* 3/2005 Hall ...................... G06F 16/957
715/205
2007/0061266 A1* 3/2007 Moore ................... G06Q 50/00
705/51
2008/0114739 A1* 5/2008 Hayes ................... G06F 16/951
(Continued)

FOREIGN PATENT DOCUMENTS

CA 2 578 513 8/2007

OTHER PUBLICATIONS

Welcome to the Zyte documentation ¶: This is the documentation for Zyte services and products (2010-2021), http://docs-zyte.com; 2 pages.
(Continued)

*Primary Examiner* — Matthew C Bella
*Assistant Examiner* — Dennis Rosario
(74) *Attorney, Agent, or Firm* — Sterne, Kessler, Goldstein & Fox P.L.L.C.

(57) ABSTRACT

ADVANCED RESPONSE PROCESSING IN WEB DATA COLLECTION discloses processor-implemented apparatuses, methods, and systems of processing unstructured raw HTML responses collected in the context of a data collection service, the method comprising, in one embodiment, receiving raw unstructured HTML documents and extracting text data with associated meta information that may comprise style and formatting information. In some embodiments data field tags and values may be assigned to the text blocks extracted, classifying the data based on the processing of Machine Learning algorithms. Additionally, blocks of extracted data may be grouped and re-grouped together and presented as a single data point. In another embodiment the system may aggregate and present the text data with the associated meta information in a structured format. In certain embodiments the Machine Learning model may be a model trained on a pre-created training data set labeled manually or in an automatic fashion.

20 Claims, 8 Drawing Sheets

(56) References Cited

U.S. PATENT DOCUMENTS

| | | | | |
|---|---|---|---|---|
| 2013/0073514 A1* | 3/2013 | Cai | ...................... | G06F 16/355 |
| | | | | 707/602 |
| 2013/0080164 A1* | 3/2013 | Zanolin | ................ | G06F 40/232 |
| | | | | 704/235 |
| 2019/0180327 A1* | 6/2019 | Balagopalan | ...... | G06Q 30/0263 |

OTHER PUBLICATIONS

Docs Suite: Diffbot Documentation—Tutorials, Guides, API reference (2021) http://docs.diffbot.com; 4 pages.

\* cited by examiner

ADVANCED RESPONSE PROCESSING IN WEB DATA COLLECTION

FIELD

The methods and systems detailed herein relate to processing response data in the context of a data collection service, wherein the processing employs a parsing toolset assisted by a trained Machine Learning classification model.

BACKGROUND

Web scraping (also known as screen scraping, data mining, web harvesting) in its most general sense is the automated gathering of data from the internet. More technically, it is the practice of gathering data from the internet through any means other than a human using a web browser or a program interacting with an application programming interface (API). Web scraping is usually accomplished by executing a program that queries a web server and requests data automatically, then parses the data to extract the requested information.

Web scrapers—programs written for web scraping—can have a significant advantage over other means of accessing information, like web browsers. The latter are designed to present information in a readable way for humans, whereas web scrapers are excellent at collecting and processing large amounts of data quickly. Rather than opening one page at a time through a monitor (as web browsers do), web scrapers are able to collect, process, aggregate and present large databases of thousands or even millions of pages at once.

Sometimes a web site allows another automated way to transfer its structured data from one program to another via an API. Typically, a program will make a request to an API via Hypertext Transfer Protocol (HTTP) for some type of data, and the API will return this data from the website in a structured form. It serves as a medium to transfer the data. However, using APIs is not considered web scraping since the API is offered by the web site (or a third party) and it removes the need for web scrapers.

An API can transfer well-formatted data from one program to another and the process of using it is easier than building a web scraper to get the same data. However, APIs are not always available for the needed data. Also, APIs often use volume and rate restrictions and limit the types and the format of the data. Thus, a user would use web scraping for the data for which an API does not exist, or which is restricted in any way by the API.

Usually, web scraping includes the following steps: retrieving Hypertext Markup Language (HTML) data from a web site; parsing the data for the desired target information; saving the desired target information; repeating the process if needed on another page. A web scraper is a program that is designed to do all these steps on a large scale. A related program—a web crawler (also known as a web spider)—is a program or an automated script which performs the first task, i.e., it navigates the web in an automated manner to retrieve raw HTML data of the accessed web sites (the process also known as indexing).

Scraping activity may be performed by multiple types of scraping applications that can be generally categorized, for example, as browser, headless browser, command line tools, programming language library, etc.

Browser—an application executed within a computing device, usually in the context of an end-user session, with the functionality sufficient to accept the user's request, pass it to the Target Web server, process the response from the Web server, and present the result to the user. Browser is considered a user-side scripting enabled tool, e.g., capable of executing and interpreting JavaScript code.

Headless browser—a web browser without a graphical user interface (GUI). Headless browsers provide automated control of a web page in an environment similar to popular web browsers but are executed via a command-line interface or using network communication. They are particularly useful for testing web pages as they are able to render and understand HTML the same way a browser would, including styling elements such as page layout, color, font selection and execution of JavaScript and AJAX which are usually not available when using other testing methods. Two major use cases can be identified:

scripted web page tests—with the purpose of identifying bugs, whereas a close resemblance to a user activity is necessary.

web scraping—where resemblance to a user activity is mandatory to avoid blocking. i.e. the request should possess all the attributes of an organic Web browsing request.

Headless browser is considered a user-side scripting enabled tool, e.g., capable of executing and interpreting JavaScript code.

Command line tools—GUI-less applications that allow to generate and submit a Web request through a command line terminal e.g. CURL. Some tools in this category may have a GUI wrapped on top, but the graphical elements would not cover displaying the result of the HTTP request. Command line tools are limited in their functionality in that they are not capable of executing and interpreting JavaScript code.

Programming language library—a collection of implementations of behavior, written in terms of a language, that has a well-defined interface by which the behavior is invoked. For instance, when particular HTTP methods are to be invoked for executing scraping requests, the scraping application can use a library containing the methods to make system calls instead of implementing those system calls over and over again within the program code. In addition, the behavior is provided for reuse by multiple independent programs, where the program invokes the library-provided behavior via a mechanism of the language. Therefore, the value of a library lies in the reuse of the behavior. When a program invokes a library, it gains the behavior implemented inside that library without having to implement that behavior itself. Libraries encourage the sharing of code in a modular fashion, and ease the distribution of the code. Programming language libraries are limited in their functionality in that they are not capable of executing and interpreting JavaScript code, unless there is another tool capable of user-side scripting, for which the library is a wrapper.

Combinations of the previous basic agent types, to a varying degree, implement HTTP protocol methods and client-side scripting.

The scraping application types listed above vary in the technical capabilities they possess, often due to the very purpose the application has been developed for. While sending the initial request to the target Web server, all of the listed types of scraping applications pass the parameters mandatory for submitting and processing a web request. e.g., HTTP parameters—headers, cookies, declare the version of HTTP protocol they support and intend to communicate in, with Transmission Control Protocol (TCP) parameters disclosed while initiating the TCP session underlying the HTTP request (e.g. TCP Windows size and others). As described above, browsers and headless browsers can process the JavaScript files obtained within the web server's response e.g., submit configuration settings through JavaScript when requested, while command line utilities are incapable of doing that.

While processing the web server's response, all of the listed types of scraping applications are capable of obtaining, interpreting, rendering or otherwise processing, and presenting the HTTP metadata and the main HTML document, whereas some of the listed scraping applications do not possess the functionality of processing the additional files obtained from the web target's response e.g., executing scripted code client side. Therefore, a practical classification of web harvesting tools is based on their ability to execute and interpret JavaScript code.

Further disclosure of the overall data collection process may concentrate on overviewing the structure of a standard Web server request.

The response obtained from the web server generally includes the following parts:
  HTTP metadata, containing HTTP headers, cookies and HTTP response code;
  the main HTML document;
  additional files needed to process and render the finalized version of the web page: images, Cascading Style Sheet (CSS) files and JavaScript (JS) scripts.

Simple HTML file contains the data formatted with the baseline HTML code, whereas MHTML file is a text file that contains full response data: main document (HTML), .css file—information about each element's styling, images, JavaScript files containing the uncompiled scripting code to be executed to render the finalized web page.

The Document Object Model (DOM) is a programming interface for HTML and XML documents. It represents the page so that programs can change the document structure, style, and content. The DOM is an object-oriented representation of the web page, ensuring that programming languages can connect to the page and operate on the elements within. The W3C DOM and WHATWG DOM standards are implemented in most modern browsers. To extend further, all of the properties, methods, and events available for manipulating and creating web pages are organized into objects e.g., the document as a whole, the head, tables within the document, table headers, text within the table cells, etc.

The modern DOM is built using multiple APIs that work together. The core DOM defines the objects that fundamentally describe a document and the objects within it. This is expanded upon as needed by other APIs that add new features and capabilities to the DOM. For example, the HTML DOM API adds support for representing HTML documents to the core DOM.

Xpath is an essential element of processing a Web page is the possibility to navigate across the hierarchy of a DOM. The)(Path language is based on a tree representation of the XML document, and provides the ability to navigate around the tree, selecting nodes by a variety of criteria. In popular use (though not in the official specification), an)(Path expression is often referred to simply as "an)(Path", wherein it contains a location of any element on a webpage using HTML DOM structure, defined in a syntax or language for finding any element on the web page using the XML path expression.

Since processing vast amounts of data manually is rarely effective or even feasible, supporting methodologies have been involved in automatizing data analysis operations. One of such methods is Machine Learning.

Machine learning can be broadly defined as computational methods using aggregated data to improve performance or to make accurate predictions. Here, aggregated data refers to the past information available to the machine learning algorithm, which typically takes the form of electronic data collected and made available for analysis.

SUMMARY

A majour drawback faced when processing a request, or a stream of requests, for a specific set of datapoints is dealing with the irrelevant, or redundant, parts of the collected data. As an example, companies that collect data from e-commerce sites and their product pages usually encounter several standard parser-based issues, primary among them— individual web sites adhere to a uniquely customized layout. Mitigated by developing a custom-tailored parsing and data collection tools, processing large numbers of sites in such a fashion relies heavily on constant development and maintenance of parsing code e.g., for pricing and product intelligence information. Moreover, the layouts of target Web pages may change frequently, requiring additional effort for data extraction and selection adjustment. This issue may be exacerbated by Web servers presenting multiple versions of the same Web page to customers, with the versions based on the country of the request origin, or browser language settings. This once again forces data collection companies to adapt their already built parsers to different localized product page layouts.

Building parsers for each individual ecommerce website is very time and resource consuming. Each potential target website has a unique HTML structure and requires unique rules to extract relevant elements such as price, title or description. As mentioned before parsers must be constantly maintained and updated, since at any time websites can change layout and HTML structure wherein previous parser rules become obsolete. A platform for data extraction and parsing that is Machine Learning-enabled, can adapt automatically to such changes and is trained to parse relevant elements without a customer per-customer set of rules and is immune to website layout changes.

To collect public data successfully and process data collection results in a way that minimizes errors and inconsistencies and aligns the results with the original data collection requirements, the scraping applications need to employ methods of adapting to the challenges. One exemplary method that ensures the content is processed, classified, and presented adequately is the advanced Web page data transformation and classification based on Machine Learning Classifier model employed for parsing and examining the responses received from Target platforms, classifying the data collected in alignment with the requested data model, and feeding the correctly labeled data back to the scraping platform. The input for classification may be obtained by extracting the HTTP part of response, scraping the extracted HTML data down to the text blocks containing the exact information desired by the requesting party, in parallel stripping the irrelevant information, as well as normalizing and formatting data accordingly. However, in some embodiments, the non-HTML part of the response may be part of the classification input e.g., the style elements assigned to the objects within the Web page.

The classification output may feed into the ultimate response data aggregation and presentation to the requesting party. The methods, among other benefits, may increase the probability of request-tailored content correctly labeled and classified at the scraping platform for further presentation to the requesting customer.

In one aspect, the embodiments detailed here disclose methods and systems of examining the content returned by content providers by processing textual elements extracted from a HTML page collected, parsing the data, identifying the appropriate classification for elements parsed, assigning a classification correspondingly, and feeding the classified data back to the scraping platform, with the response processing based on a trained Machine Learning classification model.

BRIEF DESCRIPTION OF DRAWINGS

The features and advantages of the example embodiments described herein will become apparent to those skilled in the art to which this disclosure relates upon reading the following description, with reference to the accompanying drawings.

DETAILED DESCRIPTION

Figure 1:
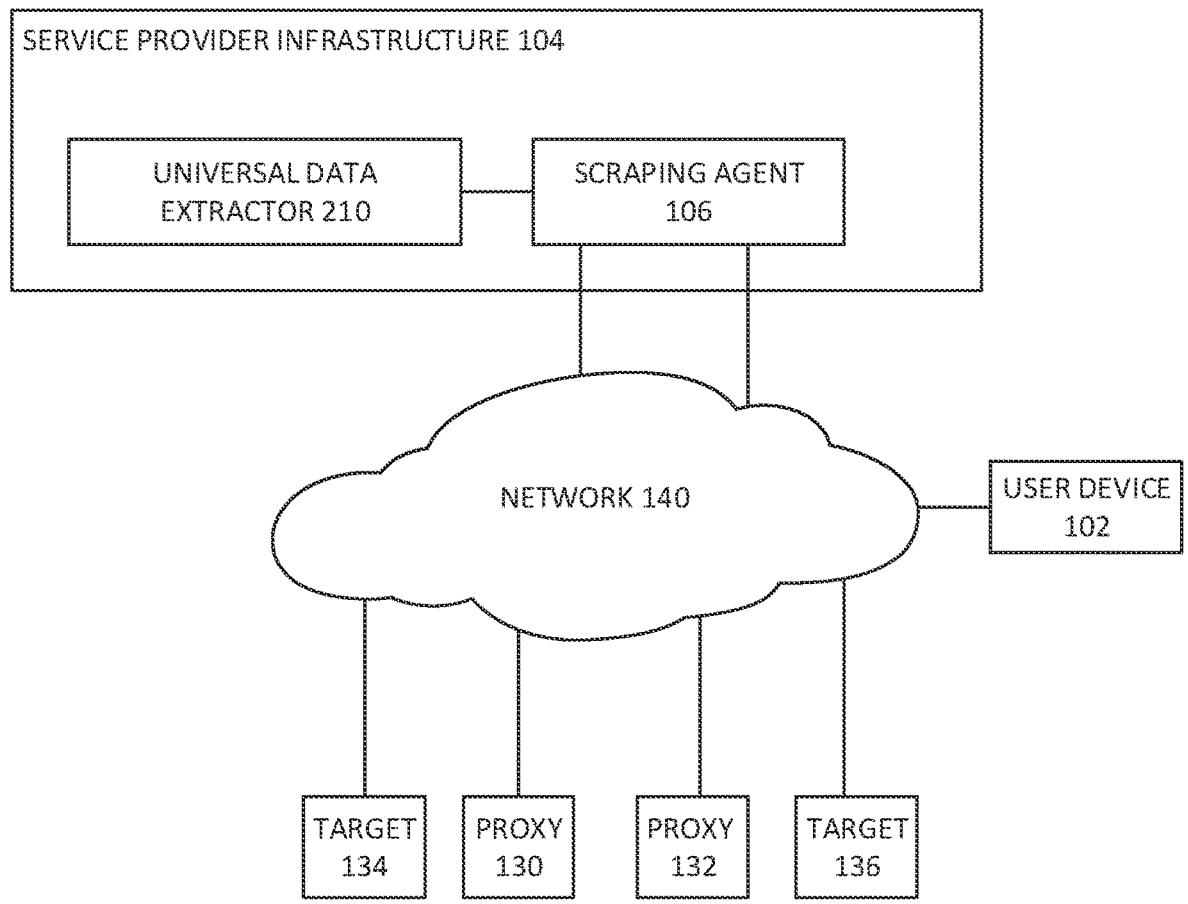
FIG. 1 is an exemplary component diagram that shows the overall architecture of components and context of at least one aspect of solution functions.

Some general terminology descriptions may be helpful and are included herein for convenience and are intended to be interpreted in the broadest possible interpretation. Elements that are not imperatively defined in the description should have the meaning as would be understood by a person skilled in the art. Elements 104, 106, 108 and 210 identify parts of the Service Provider Infrastructure, while elements 102, 130, 132, 134, 136, and 140 depict external components or systems.

User Device 102 can be any suitable user computing device including, but not limited to, a smartphone, a tablet computing device, a personal computing device, a laptop computing device, a gaming device, a vehicle infotainment device, a smart appliance (e.g., smart refrigerator or smart television), a cloud server, a mainframe, a notebook, a desktop, a workstation, a mobile device, or any other electronic device used for making a scraping request.

Service Provider Infrastructure 104 (SPI 104) is the combination of the elements comprising the platform that provides for the service of collecting data from the Internet by executing data collection requests submitted by users, processing the collected data and handing the data over to the requesting user.

Scraping Agent 106 is a component of the Service Provider Infrastructure 104 that, among other things, is responsible for containing and running the scraping applications executing scraping requests originating from the commercial users, as well as accepting said requests from users. Consequently, another role of this element is to perform data collection operations according to the requests submitted to it. Upon obtaining response data from the Target system, or systems, Scraping Agent 106 either returns the data to the requesting party or, upon identifying additional processing necessary, performs such additional processing upon the data collected.

An aspect of Scraping Agent 106 functionality is, upon obtaining the response from the Target, to submit it for further processing to components responsible for additional data evaluation, classification, and transformation operations.

Universal Data Extractor (UDE) 210 is the component of the SPI 104 responsible for accepting the calls from the Scraping Agent 106 and evaluating the data submitted within the calls, wherein the data is the content obtained during a data collection request, or multiple requests. The evaluation of said data comprises pre-processing the data contained therein, extracting relevant datapoints aligned with the original data collection request, classifying and labelling the resultant content, and ultimately returning the resultant classified and labeled data to the Scraping Agent 106, providing the probability percentile for the classification identified. UDE 210 comprises multiple components that provide for the functionalities described.

Application Programming Interface (API) 211 is an internal component of UDE 210 responsible for external communication, integrations, as well as internal communication among UDE 210 components.

Application Programming Interface (API) 211 is performing the classification and labelling of the data provided by the Scraping Agent 106. The classification employs a Datapoint Classifier Model 214 trained with a dataset specifically constructed from previously collected and labeled multiple data collection responses.

Rendering engine 212 is an internal component of UDE 210 that performs the rendering of the data to be classified, wherein it may perform additional tasks e.g., separate distinct HTML content from the MHTML data submitted for analysis and classification. Rendering may be performed by toolsets such as headless browser, among other options.

HTML Parser 213 is an internal component of UDE 210 that extracts the textual information from a HTML data isolated during the rendering of MHTML content.

Datapoint Classifier Model (DCM) 214 is an internal component of UDE 210 that classifies the new datapoints within the data provided to it based on observed patterns from the previous data i.e., the training dataset.

The actual Machine Learning-based classification model may be Bag of words, Naïve Bayes algorithm, Support vector machines, Logistic Regression, Random Forest classifier, eXtreme Gradient Boosting Model, Convolutional Neural Network, or Recurrent Neural Network.

Dataset Preparation Unit (DPU) 215 is the container object that comprises all the components and functionalities required for pre-processing data before submitting the data for classification. The toolset contained therein is described in the current embodiments in an exemplary fashion and may be expanded with additional tools adapting to the Datapoint Classifier Model 214 input requirements.

Proxies 130 and 132 indicate an exemplary multitude of proxy servers (computer systems or applications) open for client connections, that act as an intermediary for requests from clients seeking resources from other servers. A client connects to the proxy server, requesting a service, such as a file, a connection, a web page, or other resources available from a different server. The proxy server evaluates the request for content and forwards the request to the target resource, or resources, containing the content. After obtaining the content, the proxy server normally forwards the content to the original requestor, but other actions by the proxy (for example, return error message) can also be performed. In one aspect, in at least one of the embodiments detailed herein, a proxy server may not have full visibility into the actual content fetched for the original requestor, e.g., in case of an encrypted HTTPS session, if the proxy is not the decrypting end-point, the proxy serves as an intermediary blindly forwarding the data without being aware of what is being forwarded. However, the metadata of the response is always visible to the Service Provider, e.g., HTTP headers. This functionality is necessary for the proxy to correctly forward the data obtained to the correct requesting party— the end user or the mediating proxy device. Proxy 130 and Proxy 132 are presented here as a simple indication that there can be more than one proxy server held at the Service Provider Infrastructure 104 or be available externally to be employed for performing the data collection operations. The embodiments should not be limited to the proxies that belong to the Service Provider. The proxies can be owned and managed by a third party; however it is assumed that the Service Provider Infrastructure 104 has access and can use such proxies for servicing the scraping requests.

Targets 134 and 136 indicate an exemplary multitude of web servers serving content accessible through HTTP/HTTPS protocols. Target 134 and Target 136 are presented here as a simple indication that there can be more than one target, but it should not be understood in any way as limiting the scope of the disclosure. There can be an unlimited number of Targets in the Network.

Network 140 is a digital telecommunications network that allows nodes to share and access resources. Examples of a network: local-area networks (LANs), wide-area networks (WANs), campus-area networks (CANs), metropolitan-area networks (MANs), home-area networks (HANs), Intranet, Extranet, Internetwork, Internet.

The plurality of exemplary methods used to construct, train, and utilize the Datapoint classifier model for classification of response data comprise the system depicted in FIG. 1, which shows an exemplary component diagram of the overall architecture of the disclosed components and context of at least one aspect of solution functions. In at least one aspect, the present embodiments show communications between the User Device 102 and the Service Provider Infrastructure 104 to reach any Target 134, 136 on the Network 140. The Service Provider Infrastructure 104 comprises Scraping Agent 106, and Universal Data Extractor 210.

FIG. 1 demonstrates the embodiment wherein the User Device 102 and Proxy servers 130, 132 are not a part of the Service Provider Infrastructure 104. The User Device 102 can be any device that can connect to a Service Provider Infrastructure 104 through a network, in some cases it does so through the Internet. Such a device can be a computer, a mobile phone, a tablet, or any other electronic device. FIG. 1 shows that Targets 134 and 136, approached via Proxy 130 and Proxy 132 are outside of the Service Provider Infrastructure 104 and are communicably attached to any Network 140. In some embodiments the Network 140 is the Internet.

Further demonstrated in FIG. 1 are elements within Service Provider Infrastructure 104, starting with Scraping Agent 106 that accepts and processes the request from the User Device 102. While executing a request and responsive to obtaining the response from a target, Scraping Agent 106 communicates with Universal Data Extractor 210, submitting the response obtained for analysis and, ultimately, classification, with the resultant data presenting a multitude of datapoints classified and labeled, which in turn constitutes the dataset as suitable for returning to the User Device 102. Coupled with the classification marker is the probability percentile for the classification.

Figure 2:
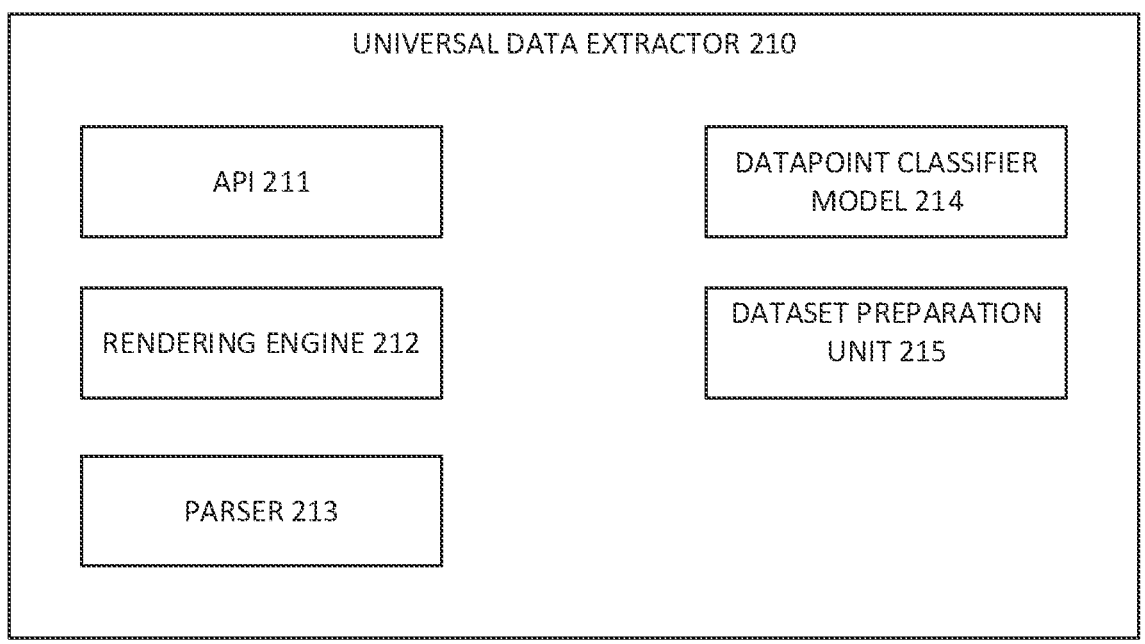
FIG. 2 is a more detailed depiction of the Data Extractor platform within the overall Service Provider infrastructure architecture.

FIG. 2 is a more detailed depiction of Universal Data Extractor 210. The components and functionalities contained therein are employed during two operational flows— 1) training of Datapoint classifier model and 2) processing regular data collection responses for extracting and classifying relevant datapoints within (described in FIG. 4).

Universal Data Extractor 210 is the component of the SPI 104 responsible for accepting, at API 211, the calls from the Scraping Agent 106 and evaluating the data submitted within the calls, wherein the data is the content obtained during a data collection request, or multiple requests. The evaluation of said data comprises preparing the data contained therein by rendering the input data with a Rendering Engine 212, extracting relevant text information with a HTML Parser 213 in alignment with the original data collection request, processing the extracted text blocks and corresponding meta information through Dataset Preparation Unit 215 (DPU 215) for deriving classification attributes, classifying and labelling the resultant datapoints based on the processing with Datapoint Classifier Model 214 (DCM 214), and ultimately returning the resultant classified and labeled data to the Scraping Agent 106, providing the probability percentile for the classification identified.

The process of classifying and labelling datapoints may operate on any voluntary set of categories. In an exemplary fashion for the present application e-commerce web pages have been chosen as the focus area. Following is an exemplary list of possible categories: price, old price, title, item description, item ID, brand name, availability, additional information, image, to name but a few.

There are at least two possible approaches to parse multiple categories:
- train one model to solve multi-class problems. In this case the Dataset preparation Unit 215 only uses one model that can return a prediction on the category the text block corresponds to, together with the probability score for each category. Maj our advantage of the approach is the fact that a single model processes the data once. However, the results delivered are of lower accuracy.
- train separate models for each category. This is a more accurate approach, but it requires repeated data classification cycles with multiple models, once for each category. The increase in accuracy is ensured by custom-tailoring each model to specific potential attributes and parameters of each category.

The process of training Datapoint Classifier Model 214 requires an initial training dataset that contains a vast amount of HTML data. Pursuant to running the training flow against the dataset each html datapoint should be labeled manually.

Figure 3:
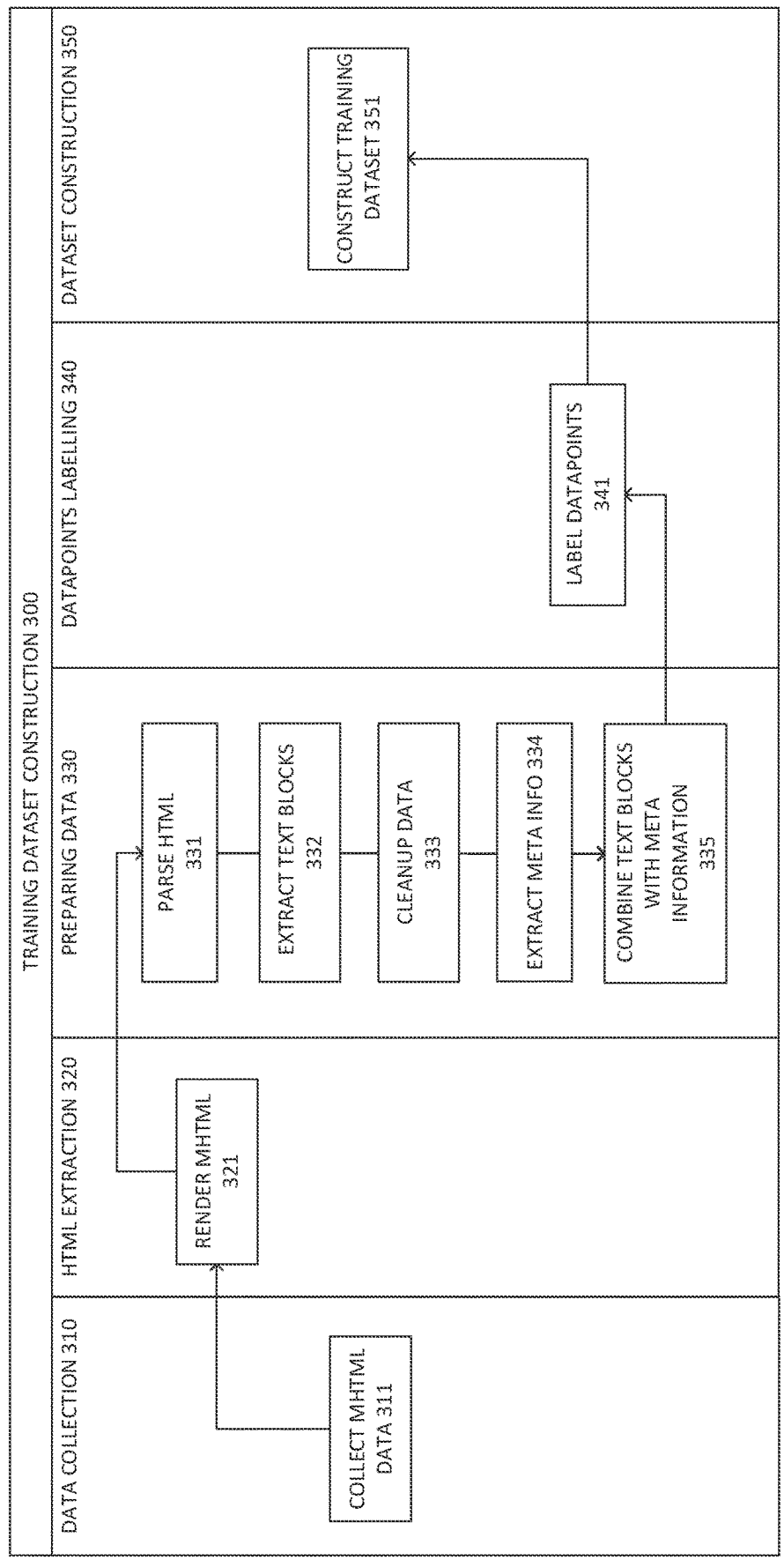
FIG. 3 demonstrates the construction of the Training dataset for the Datapoint Classifier model.

The flow of Training Dataset construction 300 is depicted in FIG. 3, wherein the initial set of MHTML Data 311, aggregated from the results of multiple instances of Data Collection 310, is submitted to HTML Extraction 320 through rendering MHTML that results in the HTML Data 321 extracted.

The resultant data is then submitted to the Preparing Data 330 flow, comprising the steps of:
  parsing the HTML part of the response at step 331;
  extracting, at step 332, blocks of text from the HTML parsed, together with the xpath parameter of each text block, with an optional joining the text blocks representing the same informational item;
  data cleanup, comprising removing all irrelevant text blocks, at step 333;
  extracting at step 334 of meta information associated with each text block, comprising HTML tag/class attributes, textual attributes, style attributes, xpath attributes. The attributes may be ultimately defined by custom numerical values, consequently combined in a string.
  at step 335 the text blocks identified are combined with the associated meta information, establishing a datapoint to be classified.

During Datapoint Labelling 340, the datapoints are labelled at step 341, ensuring proper input while the Training Dataset 351 is constructed during Dataset Construction 350. The purpose of the manual labelling is to ensure the input for training of the Datapoint Classifier Model 214 contains data that promotes correct prediction behaviour therefore assuring better accuracy of classification. The Dataset Construction 350 stage of the processing results in a Training Dataset 351 prepared.

Figure 4:
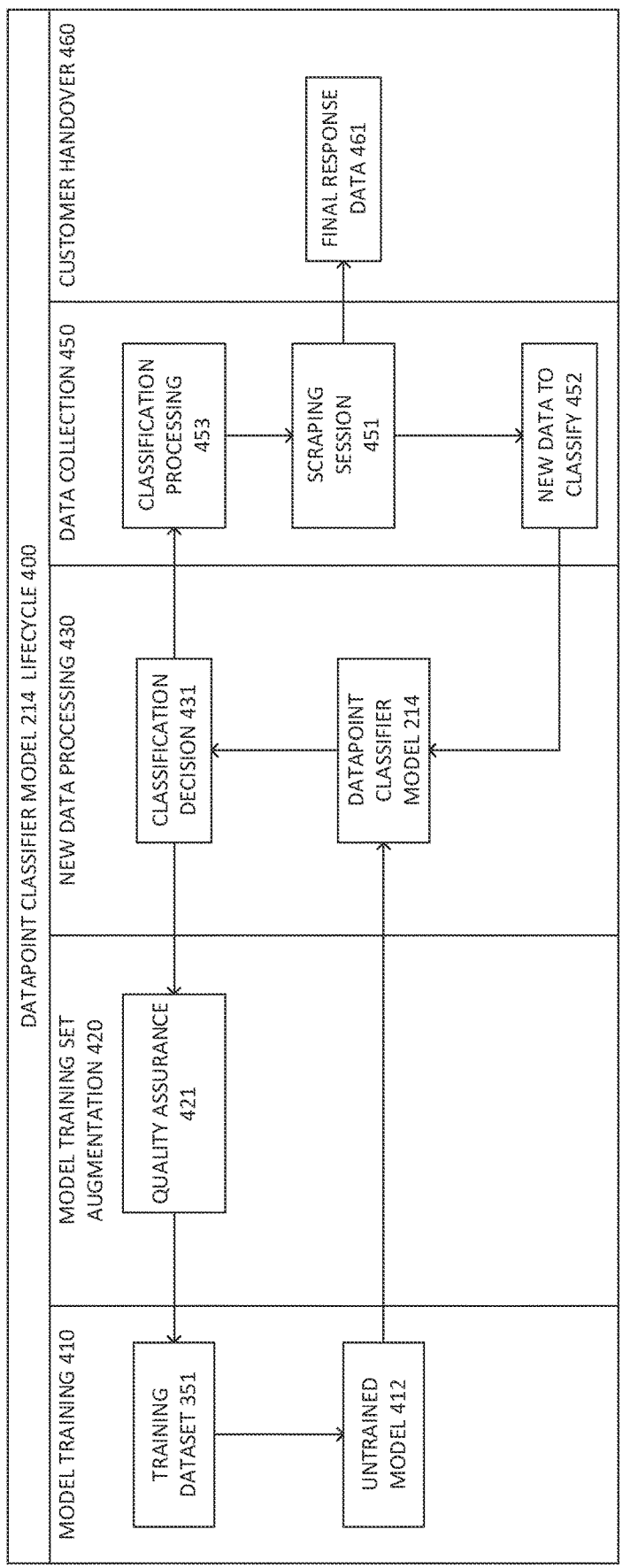
FIG. 4 depicts the lifecycle and the overall functioning of the Datapoint Classifier model, starting from the initial training phase, the processing of the actual requests, and the looped feedback model that updates the training dataset with the classification decisions that passed human examination.

FIG. 4 demonstrates the full Datapoint Classifier Model 214 lifecycle 400, starting with the Model Training 410, wherein Training dataset 351 from Training Dataset Construction 300 in FIG. 3 is presented to the Untrained Model 412. Upon the training, the model reaches its production stage (Datapoint Classifier Model 214) at the stage New Data Processing 430, ready to process actual requests to classify New Data to Classify 452. The results of classification—Classification Decision 431—is submitted back to the Data Collection 450 process, where Classification Processing 453 takes place, wherein the results are handed over to Scraping Session 451 with the Final Response Data 461 submitted to the customer during the stage of Customer Handover 460.

In another aspect of the embodiment presented herein, an adaptable percentage of the Classification Decision 431 instances, constructed during the stage New Data Processing 430, may be integrated into the Training Dataset 351, provided the analyzed data and the resultant classification are subjected to Model Training Set Augmentation process 420, wherein their correctness is confirmed during Quality Assurance 421 and they are integrated into the Model Training Dataset 351. The continuous quality assured input for updating Training Dataset 351 ensures correctness of future classifications by Datapoint Classifier Model 214.

Figure 5:
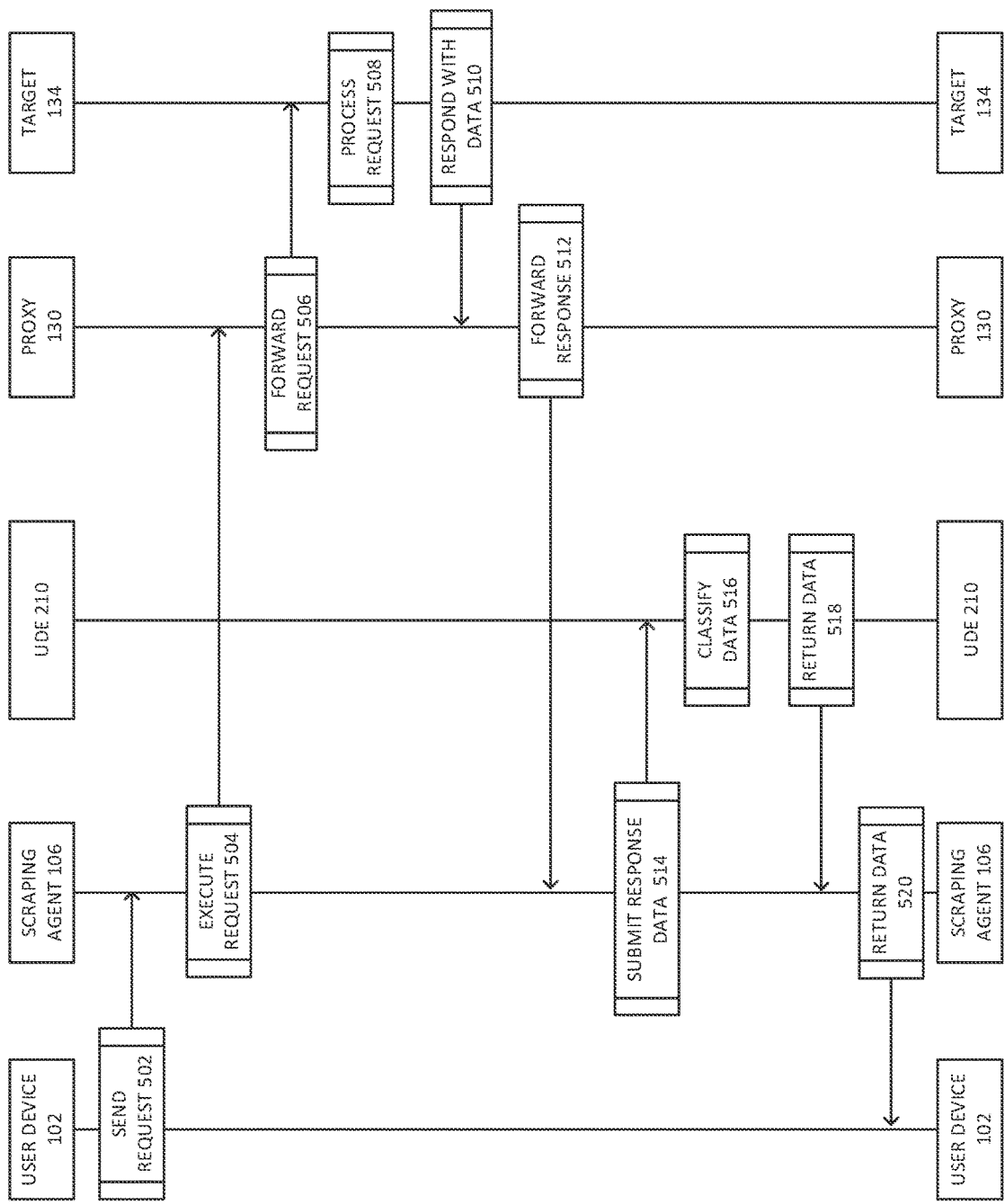
FIG. 5 is a demonstration of data collection request overall flow.

FIG. 5 is a sequence diagram, describing the overview of the route a scraping request takes. The flow starts with a User device 102 submitting a scraping request at step 502, with the Scraping Agent 106 as the entry point to the Service Provider Infrastructure 104, whereas the processing of the request at step 504 comprises further execution through the Proxy 130. The Proxy server 130 in turn submits the request (step 506) to the Target 134. At step 508, Target 134 processes the request, and delivers the content requested to the Proxy server 130 at step 510, the content consequently delivered by Proxy server 130 to the Scraping Agent 106 at step 512. The response data is submitted for classification and labelling to Universal Data Extractor 210 at step 514, wherein at step 516 the response is processed, analyzed and classified within UDE 210 and at step 518 returned to Scraping Agent 106 in the form of a structured and classified dataset, which is ultimately transferred to the original requestor at step 520 either directly or through an asynchronous callback request.

Figure 6A:
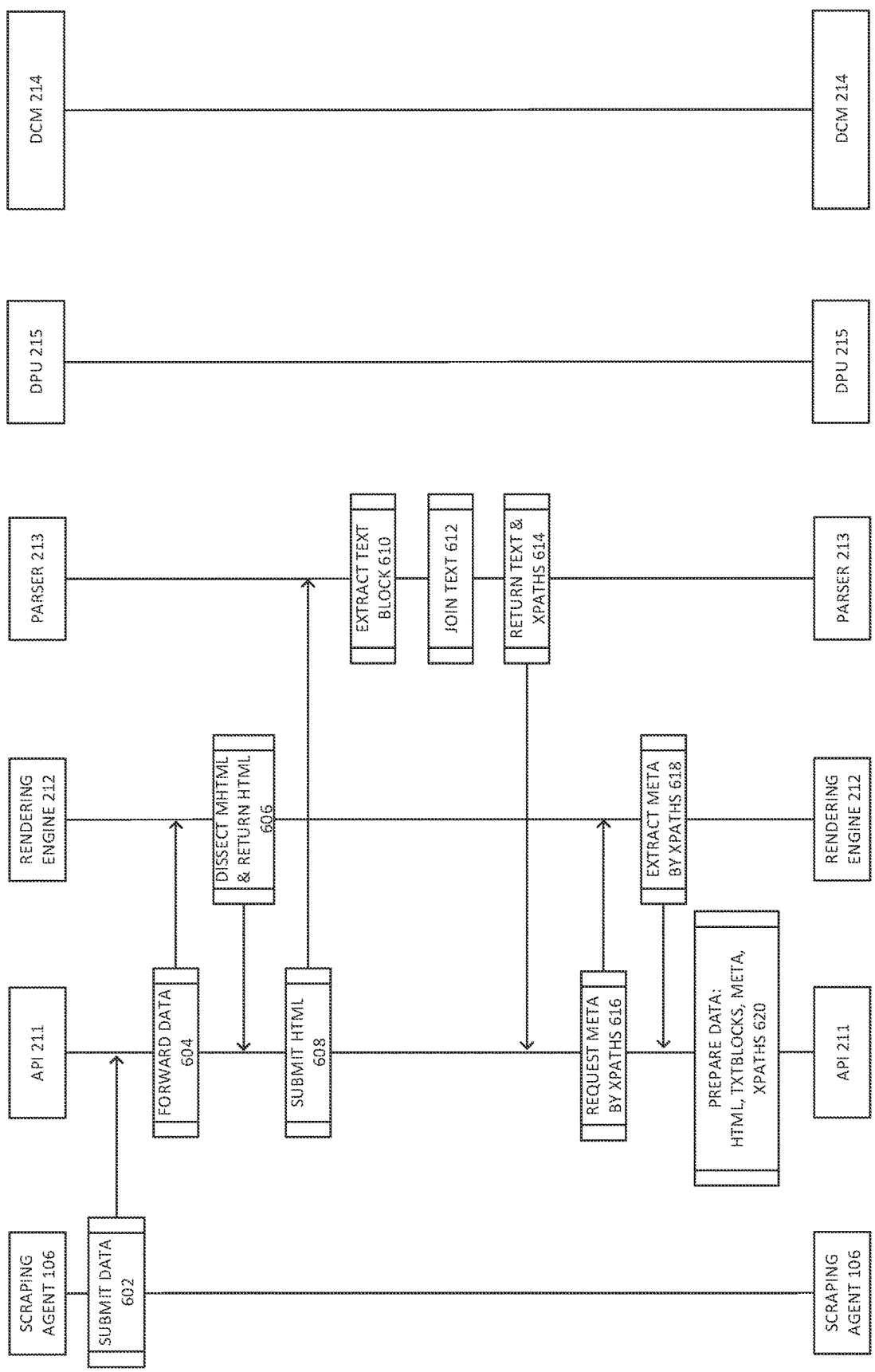
FIG. 6a is a depiction of the collected data classified and transformed.
Figure 6B:
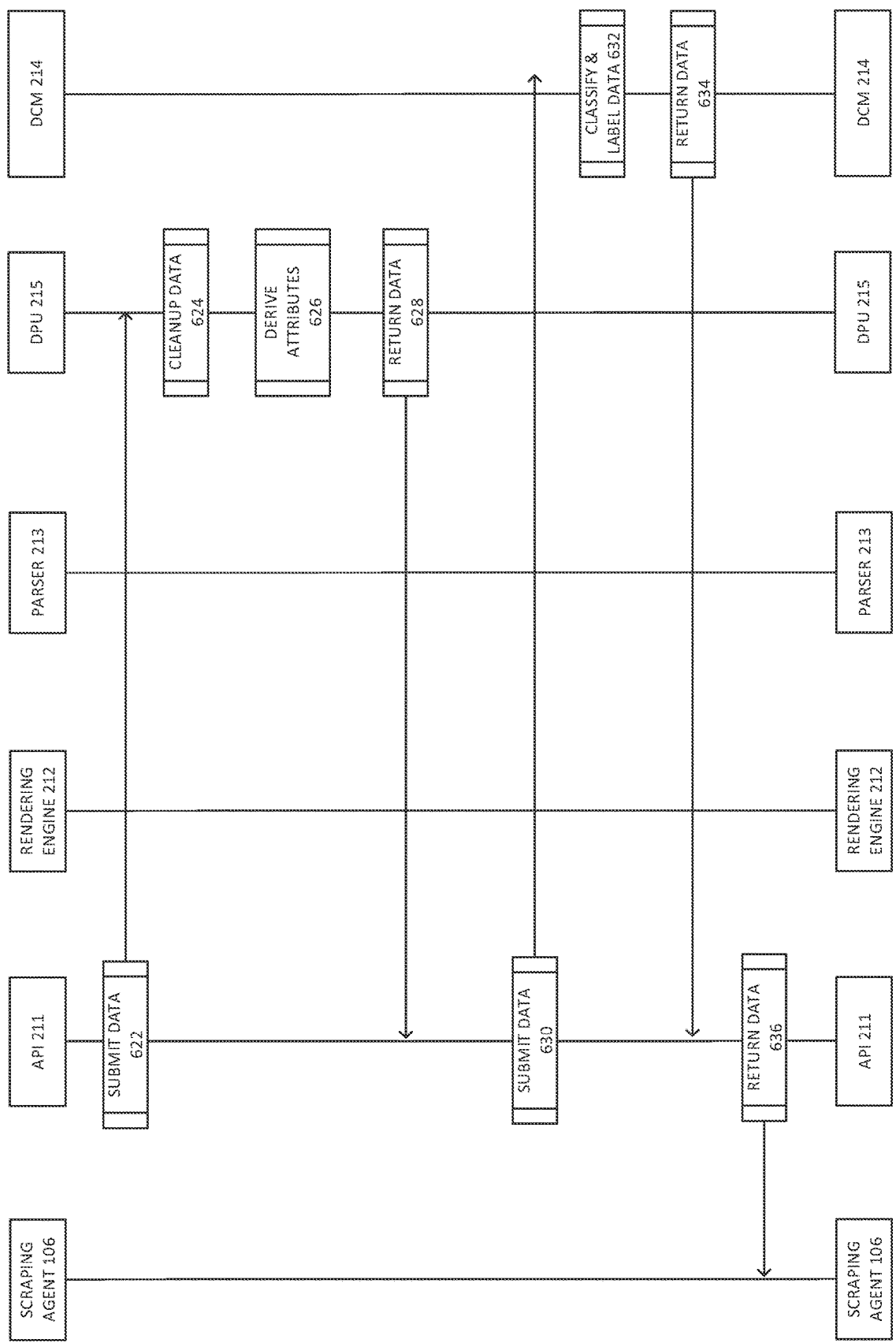
FIG. 6b is a continuation of FIG. 6a, further depicting the process of data classified and transformed.

FIGS. 6A and 6B depict in a more detailed manner the route that the response data takes and the operations the data undergoes in order to be transformed from the original raw and unstructured MHTML format obtained from the Target Web servers to a structured, classified and labelled dataset.

Starting within Scraping Agent 106, at step 602 the response obtained from the Target Web server is submitted in its entirety for classification and transformation to Universal Data Extractor 210, namely the integration interface of UDE 210-API 211. The data here is an MHTML file, a text file that contains full response data: main document (HTML), css files, images, javascript files, etc. Consequently the data is transferred at step 604 to an internal UDE 210 component—Rendering Engine 212, in the current embodiment—a headless browser, that in turn, at step 606, separates the HTML part of the data submitted and returns the result back to API 211. Here at step 608 the HTML file is handed over to the Parser 213 component of UDE 210 for extracting text from HTML input with the respective xpaths elements at step 610. Employing text block joining algorithms Parser 213 may have to combine text elements from disparate HTML elements at step 612, provided the text blocks describe related unit of information. At step 614 the output is returned by Parser 213 to API 211 as text blocks with corresponding xpaths, which are essentially the paths to the HTML elements text blocks were extracted from.

During the following step 616 API 211 obtains the meta information for the text blocks identified, by submitting a request to the Rendering Engine 212, wherein the request contains the xpaths for the desired text blocks, and the Rendering Engine 212 extracts and returns the requested tags, classes, ids, variables, and style elements corresponding to the text blocks at step 618.

At this stage API 211 possesses the original HTML file, text blocks extracted from it, as well as xpaths, HTML tag/class and style elements associated with the text blocks and at step 620 prepares the data for processing.

FIG. 6b is a continuation of FIG. 6a, further describing how at step 622 API 211 proceeds to submit this data for classification to Data Preparation Unit 215 which cleans the data, removing elements redundant for classification at step 624, and performs steps to identify and evaluate attributes pertinent for classification of each text block. Since the ultimate goal is to recognize which text block belongs to which category (e.g., price, old price, title, description, etc.) the steps of identification are processed for each text block at step 626. A more detailed description of data cleanup and preparation is disclosed as one of the many potential ways to prepare data for Machine Learning model based classification.

During Data cleaning at step 624 some text blocks are eliminated from the dataset. With fewer datapoints in the dataset, it is easier for the model to find the correct text block for the required category. For example, if a text block style attribute "visibility" is equal to "hidden" the text block is deemed as irrelevant since it is not visible in the HTML file and most probably either does not contain any relevant information, or cannot be reliably assigned to any category, and in both cases should be ignored.

A text block that does not contain any text or only contains a single character is another demonstration of redundant data. In this situation it also either does not carry valuable information or cannot be reliably assigned to any category.

Step 626 contains the activities performed to identify meta attributes associated with each text block and derive them from the meta information, comprising:

HTML attributes: In this step the data preparation unit extracts information from HTMLs tags, classes, ids and variables, with the potential attributes as follows:
- text block element contains certain tag in HTML source;
- text block element contains certain class in HTML source;
- text block element contains certain variables in HTML source.

Textual attributes: In this step the data preparation unit extracts information from already extracted text elements. Here are some examples of text related attributes:
- characters count of the text block;
- words count of the text block;
- sentences count of the text block;
- text block contains specific keywords;
- digits ratio in text block;
- special characters ratio in text block;
- text block contains a dot.

Style attributes: Essential and relevant information may be contained within style-related attributes because there may be over 160 style attributes for each text block, containing information about the text block that may provide valuable input, helping the Datapoint Classification Model 314 to predict the text block category. Some of the examples of important style attributes are:
- text block position in html;
- text block color;
- text block font style;
- text block font size;
- is the text block underlined.

Xpath-related attributes: A number of attributes can be derived from the xpath parameter associated with a text block:
- text block element depth in html;
- does a specific keyword exist in the xpath of a particular text block.

The results of attribute identification and evaluation are returned to API 211 at step 628, wherein the entirety of datapoints is submitted at step 630 to Datapoint Classifier Model 214. At this point a datapoint contains a single text block and classification attributes identified, evaluated, and prepared by Dataset Preparation Unit 215. The actual classification occurs at step 632, wherein the model classifies and predicts the category of every datapoint. At step 634, the model returns the classification for each datapoint to API 211, together with the probability score associated with the classification and the datapoint. At this stage the dataset at API 211 contains each datapoint (text block) predictively associated with a particular category. For example, if Data Preparation Unit 215 and Datapoint Classifier Model 214 were used to predict which element is the price, at this point API 211 can just pick the text element with the highest price probability score and treat it as "a price" for further analytical steps.

In some of the embodiments the Universal Data Extractor 210 may operate based on multiple categorization models (set of categories), wherein a requesting user device may submit preferences as to which classification model is required, via parameters of the request.

In another embodiment the classification model employed may be an implementation of one of the following Machine Learning models—Bag of words, Naïve Bayes algorithm, Support vector machines, Logistic Regression, Random Forest classifier, Extreme Gradient Boosting Model, Convolutional Neural Network or Recurrent Neural Network.

In yet another embodiment a classification decision at a classification platform is submitted for quality assurance wherein the classification assigned is examined and confirmed. The classification decision subjected to quality assurance is categorized as correct and becomes a part of future machine learning classification model training and is incorporated into the corresponding training set.

Figure 7:
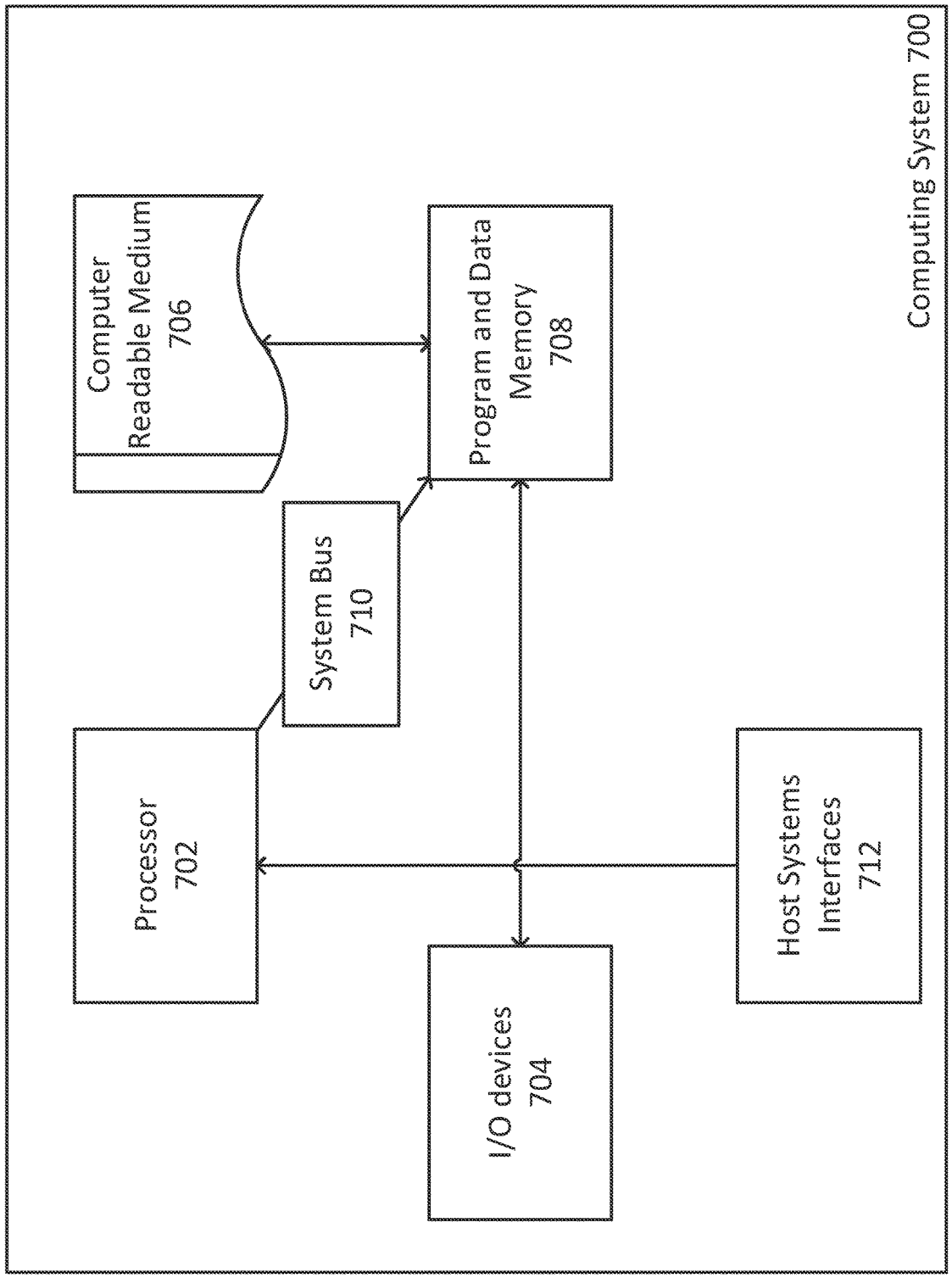
FIG. 7 is an exemplary computing system performing the methods disclosed.

Any of the above embodiments herein may be rearranged and/or combined with other embodiments. Accordingly, the concepts herein are not to be limited to any embodiment disclosed herein. Additionally, the embodiments can take the form of entirely hardware or comprising both hardware and software elements. Portions of the embodiments may be implemented in software, which includes but is not limited to firmware, resident software, microcode, etc. FIG. 7 illustrates a computing system 700 in which a computer readable medium 706 may provide instructions for performing any of the methods disclosed herein.

Furthermore, the embodiments can take the form of a computer program product accessible from the computer readable medium 706 providing program code for use by or in connection with a computer or any instruction execution system. For the purposes of this description, the computer readable medium 706 can be any apparatus that can tangibly store the program for use by or in connection with the instruction execution system, apparatus, or device, including the computer system 700.

The medium 706 can be any tangible electronic, magnetic, optical, electromagnetic, infrared, or semiconductor system (or apparatus or device). Examples of a computer readable medium 706 include a semiconductor or solid-state memory, magnetic tape, a removable computer diskette, a random-access memory (RAM), NAND flash memory, a read-only memory (ROM), a rigid magnetic disk, and an optical disk. Some examples of optical disks include compact disk-read only memory (CD-ROM), compact disk-read/write (CD-R/W) and digital versatile disc (DVD).

The computing system 700, suitable for storing and/or executing program code, can include one or more processors 702 coupled directly or indirectly to memory 708 through a system bus 710. The memory 708 can include local memory employed during actual execution of the program code, bulk storage, and cache memories which provide temporary storage of at least some program code in order to reduce the number of times code is retrieved from bulk storage during execution. Input/output or I/O devices 704 (including but not limited to keyboards, displays, pointing devices, etc.) can be coupled to the system either directly or through intervening I/O controllers. Network adapters may also be coupled to the system to enable the computing system 700 to become coupled to other data processing systems, such as through host systems interfaces 712, or remote printers or storage devices through intervening private or public networks. Modems, cable modems, and Ethernet cards are just a few of the currently available types of network adapters.

Identifiers, such as "(a)," "(b)," "(i)," "(ii)," etc., are sometimes used for different elements or steps. These identifiers are used for clarity and do not necessarily designate an order for the elements or steps.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential features or elements of any or all the claims. The invention(s) are defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", 'includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way, but may also be configured in ways that are not listed. For the indication of elements, a singular or plural forms can be used, but it does not limit the scope of the disclosure and the same teaching can apply to multiple objects, even if in the current application an object is referred to in its singular form.

The embodiments detailed herein are provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment in at least some instances. Thus, the following claims are hereby incorporated into the Detailed Description, with each claim standing on its own as separately claimed subject matter.

This disclosure presents method for classifying text blocks of a data collection response, comprising:

(a) receiving the data collection response that was scraped from a data collection target according to a data collection request wherein the request originates at a requesting user device;

(b) obtaining a plurality of text blocks from the data collection response;

for each text blocks in the plurality of text blocks:

(c) obtaining a path describing a location of the respective text block within the data collection response;

(d) collecting, within the data collection response via the path, meta attributes describing the text block's display and functional characteristics within a page specified by the data collection response;

(e) deriving classification attributes from the text block, the path and the meta attributes;

(f) executing a trained machine learning classification model against the classification attributes to determine a classification for the text block;

(g) constructing a dataset with the plurality of text blocks and corresponding classifications determined in (f) for each text block in the plurality of text blocks; and (h) communicating the dataset to the requesting user device.

The method is presented wherein the received data collection response is in HTML format.

The method is presented wherein the received data collection response is in MHTML format.

The method is presented further comprising rendering the MHTML to extract an HTML file, wherein the obtaining (b) comprises the obtaining the plurality of text blocks from the HTML file.

The method is presented wherein collecting (d) comprises collecting the meta attributes from HTML and non-HTML parts of the data collection response.

The method is presented wherein a datapoint comprises a text block, the associated meta attributes, the corresponding path and the source HTML element within the data collection response.

The method is presented wherein further comprising pre-processing of the datapoint to derive classification attributes from the associated meta attributes, and assigning the associated classification attributes to the corresponding text block.

The method is presented wherein classification attributes assigned to a text block are derived from at least one of a group selected from HTML tags, classes, ids and variables of the text block, textual attributes of the text block, style attributes of the text block, and the path.

The method is presented wherein the classification attributes identified are registered and assigned to the text block in a numerical format.

The method is presented wherein the meta attributes include style information.

The method is presented further comprising joining separate text blocks from the plurality of text blocks.

The method is presented wherein the executing (f) comprises applying the classification attributes to a plurality of machine learning classification models, each of the plurality of machine learning classification models trained to identify whether the text block belongs to a category.

The method is presented wherein the plurality of machine learning classification models each determine a classification probability indicating a likelihood that the text block belongs to the category that the respective machine learning classification model is trained to detect.

The method is presented wherein the trained machine learning classification model employed is at least one of the following, though not limited to: Bag of words, Naïve Bayes algorithm, Support vector machines, Logistic Regression, Random Forest classifier, or Extreme Gradient Boosting Model.

The method is presented wherein a classification decision at a classification platform is submitted for quality assurance wherein the classification assigned is examined and confirmed through crowd-sourcing.

The method is presented wherein the classification decision subjected to quality assurance is categorized as correct and becomes a part of future machine learning classification model training and is incorporated into the corresponding training set.

The method is presented wherein the data collection response includes non-textual information.

The method is presented wherein content delivered within the non-textual information is processed by the trained machine learning classification model.

The method is presented wherein the communicating (h) is executed via a mediating component such as a scraping agent.

The method is presented wherein a data collection response is not submitted for classification if obtaining (b) returns no identifiable text blocks, and the request is re-submitted as a data collection request.

What is claimed is:

1. A method for classifying text blocks of a data collection response, comprising:
   (a) receiving the data collection response that was scraped from a data collection target according to a data collection request wherein the request originates at a requesting user device;
   (b) obtaining a plurality of text blocks from the data collection response:
   for each text block in the plurality of text blocks;
   (c) removing redundant text blocks from the plurality of text blocks resulting in a set of text blocks from the plurality of text blocks;
   (d) obtaining a path describing a location of a respective text block from the set of text blocks within the data collection response;
   (e) collecting, within the data collection response via the path, meta attributes describing the respective text block's display and functional characteristics within a page specified by the data collection response;
   (f) deriving classification attributes from the respective text block, the path and the meta attributes;
   (g) executing a trained machine learning classification model against the classification attributes to determine a classification for the respective text block;
   (h) constructing a dataset with the set of text blocks and corresponding classifications determined in (g) for each text block in the set of text blocks; and
   (i) communicating the dataset to the requesting user device.

2. The method of claim 1, wherein the received data collection response is in HTML format.

3. The method of claim 1, wherein the received data collection response is in MHTML format.

4. The method of claim 3, further comprising rendering the MHTML to extract an HTML file, wherein the obtaining (b) comprises the obtaining the plurality of text blocks from the HTML file.

5. The method of claim 4, wherein collecting (e) comprises collecting the meta attributes from HTML and non-HTML parts of the data collection response.

6. The method of claim 1, wherein a datapoint comprises the respective text block, respective meta attributes, a corresponding path and the source HTML element within the data collection response.

7. The method of claim 6, wherein further comprising pre-processing of the datapoint to derive classification attributes from the respective meta attributes, and assigning associated classification attributes to a corresponding text block.

8. The method of claim 7, wherein the associated classification attributes assigned to the corresponding text block are derived from at least one of a group selected from HTML tags, classes, identifiers (IDs) and variables of the respective text block, textual attributes of the respective text block, style attributes of the respective text block, and the path.

9. The method of claim 8, wherein the associated classification attributes are registered and assigned to the corresponding text block in a numerical format.

10. The method of claim 1, wherein the meta attributes include style information.

11. The method of claim 1, further comprising joining separate text blocks from the plurality of text blocks.

12. The method of claim 1, wherein the executing (g) comprises applying the classification attributes to a plurality of machine learning classification models, each of the plurality of machine learning classification models trained to identify whether the respective text block belongs to a category.

13. The method of claim 12, wherein the plurality of machine learning classification models each determine a classification probability indicating a likelihood that the respective text block belongs to the category that the respective machine learning classification model is trained to detect.

14. The method of claim 1, wherein the trained machine learning classification model employed is at least one of the following: Bag of words, Naïve Bayes algorithm, Support vector machines, Logistic Regression, Random Forest classifier, or Extreme Gradient Boosting Model.

15. The method of claim 1, wherein a classification decision at a classification platform is submitted for quality assurance wherein the classification assigned is examined and confirmed through crowd-sourcing.

16. The method of claim 15 wherein the classification decision subjected to quality assurance is categorized as correct and becomes a part of future machine learning classification model training and is incorporated into the corresponding training set.

17. The method of claim 1, wherein the data collection response includes non-textual information.

18. The method of claim 17, wherein content delivered within the non-textual information is processed by the trained machine learning classification model.

19. The method of claim 1, wherein the communicating (g) is executed via a scraping agent.

20. The method of claim 1, wherein a data collection response is not submitted for classification in response to the obtaining of (b) returns no identifiable text blocks, and the request is re-submitted as a data collection request.

* * * * *